UNITED STATES PATENT OFFICE.

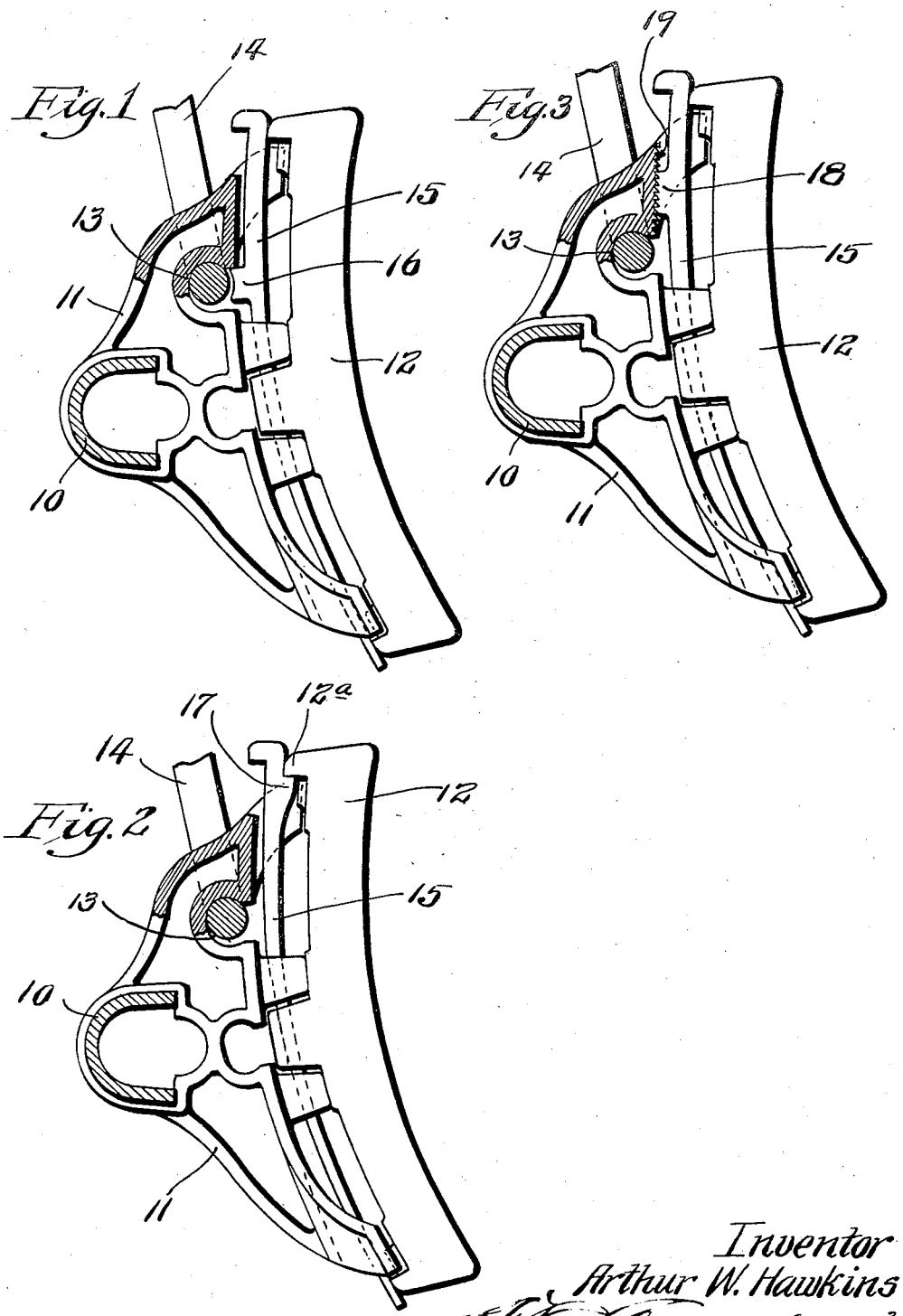

ARTHUR W. HAWKINS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-SHOE-KEY LOCK.

1,304,044.　　　　　Specification of Letters Patent.　　Patented May 20, 1919.

Application filed October 4, 1917. Serial No. 194,715.

*To all whom it may concern:*

Be it known that I, ARTHUR W. HAWKINS, a citizen of the United States, residing in the city of Chicago, county of Cook, and State of Illinois, have invented a certain new and useful Improvement in Brake-Shoe-Key Locks, of which the following is a full, clear, and exact description, such as will enable others skilled in the art to which it appertains to make and use the same, reference being had to the accompanying drawings, forming part of this specification.

My invention relates generally to improvements in the brake heads for railway car brake equipment, and more particularly to means for securing and retaining the brake shoe keys in locking position, it being understood that the brake shoes are retained in position upon the brake heads by means of elongated keys which are removably seated in the apertures of lugs formed on said brake shoes and heads.

The principal object of my invention is to construct the brake shoe key so that it will engage a part of the brake head or brake shoe in such a manner as to be effectually retained in locking position under normal conditions.

It will be understood that the brake shoe key is constructed of resilient material and when driven into locking position performs the functions of a wedge and exerts yielding pressure against parts of the head and shoe to hold the latter firmly in position and prevent vibration and rattling. I propose to form on the brake shoe key a comparatively small lug or projection or a plurality of projections, the same being adapted to engage with parts of the brake head or brake shoe when the key is driven home, such construction effectively retaining the key in locking position and preventing it from becoming accidentally displaced or withdrawn.

With the foregoing and other objects in view my invention consists of certain novel features of construction and arrangement of parts hereinafter more fully described and claimed.

Figure 1 is an elevational view, partly in section, of a brake head, brake shoe and brake shoe key, the latter being provided with a brake head engaging lug or shoulder as contemplated by my invention.

Fig. 2 is an elevational view, partly in section, of a brake head and brake shoe and showing a modified form of the brake shoe key;

Fig. 3 is an elevational view, partly in section, of a brake head and brake shoe and showing a further modified form of the brake shoe key.

Referring by numerals to the accompanying drawings which illustrate various practical embodiments of my invention, 10 designates a brake beam, 11 a brake head of ordinary construction, and 12 a brake shoe, which latter is fitted to the head in the usual manner. Brake head 11 is provided with a recess 13 which receives the lower end of the usual brake hanger 14. The numeral 15 designates the brake shoe key, the same being formed of an elongated strip of resilient metal, preferably steel, and in accordance with my invention, there is formed integral with the rear side of this key, a lug or projection 16 which, when the key is properly applied for use, projects into the mouth of the brake hanger opening 13 with the top of said lug or projection bearing against the top of the mouth of said opening. With the parts thus assembled, the brake shoe 12 is effectually secured to the brake head 11, and the brake shoe key 15 is firmly secured in its locking position. To remove this form of key to permit the detachment of the brake shoe, a tool such as a wedge or chisel is inserted between the upper portion of the key and that portion of the brake head above the brake hanger opening 13, and sufficient pressure is applied to the upper portion of the key to force the lug or projection 16 out of the opening 13.

In the modified construction illustrated in Fig. 2, a lug or projection 17 is formed near the upper end of the brake shoe key 15, and this lug or projection engages directly against the underside of the lug 12$^a$ which is formed on the rear side of the upper end of the brake shoe 12. This arrangement effectively maintains the brake shoe key in locking position, and when said key is to be removed, a wedge or chisel is utilized to spring the upper portion of said key a sufficient distance away from the brake shoe to permit lug or projection 17 to pass the lug 12$^a$.

In the modified construction illustrated in Fig. 3, the key 15 is provided on its rear face near its upper end with a projecting portion 18, the outer face of which is provided with transversely disposed teeth or serrations, the same being adapted to interlock with corresponding teeth or serrations 19 formed on the face of that portion of the brake head which is immediately above the brake hanger opening.

It will be understood that when any of the various forms of my improved keys are released from their engagement with parts of the brake head and brake shoe, said keys can be wholly withdrawn and disengaged from said head and shoe.

Brake shoe keys of my improved construction are comparatively simple, can be easily and cheaply manufactured and readily combined with parts of the brake heads and brake shoes so as to be positively retained in locking position and effectually prevented from being accidentally displaced or withdrawn.

I am aware that my improved brake shoe key is susceptible of various minor changes and modifications without departing from the scope of the invention as set forth in the appended claims.

I claim:

1. A brake shoe key lock comprising the combination of a brake head, a brake shoe adapted to be secured in position thereon, and a tapered key for securing said parts together, said key being made of resilient material and having a head at its upper or thicker end, and a shoulder adjacent said head for engaging with a shoulder on the brake head whereby said key is locked in its home position but is capable of being removed by springing the headed end to one side to disengage said shoulders, the brake head being provided with a space, or spaces, to permit such springing action of the headed end of the key incident to its removal.

2. A key for locking brake shoes to brake heads, said key being of slightly curved shape and having a locking projection on its concave side adjacent the head thereof, said projection being arranged to engage a shoe directly beneath a shoulder at the upper portion of said shoe.

In testimony whereof I hereunto affix my signature this 29th day of September, 1917.

ARTHUR W. HAWKINS.

Witnesses:
E. T. WALKER,
M. F. HUNTOON.